Patented Aug. 14, 1945

2,382,178

UNITED STATES PATENT OFFICE 2,382,178

PROCESS OF CONCENTRATING ORES

Karl F. Schilling, Lakeland, Fla., Allen T. Cole, Cartersville, Ga., and James B. Duke, Mulberry, and Wesley M. Houston, Lakeland, Fla., assignors to Minerals Separation North American Corporation, New York, N. Y., a corporation of Maryland No Drawing. Application May 29, 1944, Serial No. 537,974

15 Claims. (Cl. 209—49)

This invention relates to the concentration of ores. Particularly, it relates to separating the components, with a view to recovering the valuable constituents, of a wide variety of non-sulfide ores and minerals. More particularly it relates to those in which non-sulfide non-silicate minerals are admixed with silicious gangue, or in which silicate minerals are admixed with quartz, or in which potash minerals occur in their soluble ores. Among such ores and minerals, to the benefication of which the invention is particularly adapted, are phosphate, iron ore, barite, calcite, feldspar, fluorspar, kyanite, industrial sands and the constituents of soluble ores such as sylvinite.

The invention resides in the discovery of a new type of collector which is a phosphorous compound belonging to the group of phosphoric acid amides. Compounds of this type are referred to hereinafter as phosphonamides. Structurally they derive from ortho phosphoric acid,

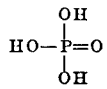

by substitution of one or more OH groups with one or more $NH_2$ groups, the simplest being phosphoric acid monoamide,

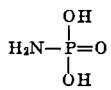

which is herein called phosphonamide.

All of the collectors of this invention are characterized, and chemically differentiated from collectors previously known to the art, by the fact that they contain the fundamental phosphonamide group

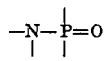

Included in this newly discovered class of collectors are the alkyl, alkylene, phenyl, cycloalkyl, abietyl and urea substituted phosphonamides, their salts and halides.

However, to enable these compounds to function as collectors it is necessary that they contain at least one hydrocarbon group which is hereto defined for convenience as a "functioning hydrocarbon group." This group may be: (a) an aliphatic group containing 7 or more carbon atoms at least 5 of which must be in a single straight chain; or (b) a hydrocarbon group such as is present in abietic acid or (c) an alicyclic hydrocarbon group such as is present in naphthenic acids; or (d) a naphthalene or substituted benzene group.

Examples of functioning hydrocarbon groups are octyl, lauryl, myristyl, stearyl, oleyl, 7-ethyl-2-methyl-undecane and abietyl groups and the naphthenyl groups having the empirical formulae $C_nH_{2n-2}O_2$ where $n$ is 8–13 and $C_nH_{2n-4}O_2$ and $C_nH_{2n-6}O_2$ where $n$ is 14–25.

The preferred collectors of the invention are those compounds which contain at least one fundamental phosphonamide group and at least one functioning hydrocarbon group. The general structural formula for these compounds may be represented as

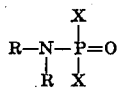

wherein R is a functioning hydrocarbon group, hydrogen or an amido group (—CO.NH); X is OR, NRR, OY, or a halogen; Y being a salt-forming group or element and at least one R in the molecule being a functioning hydrocarbon group.

These compounds are readily prepared by methods well known to those skilled in the art. For example, they may be prepared by condensing ortho phosphoric acid or the substituted phosphoric acids or their amides with the proper amines or their hydrohalides, or by reacting phosphorus oxychloride with amines or by reacting the ammonium salts of phosphoric acid with suitable organic halides. Certain compounds of the invention may be prepared by reacting a substituted phosphoric acid with urea. Ammonium, amine, metal and alkali metal salts of the phosphonamides may be formed by well known procedures.

The phosphonamide collectors of this invention have cationic activity and function as collectors for quartz, other silicious materials and sylvite. This is surprising, as heretofore cationic collectors have been considered to be basic compounds or the salts thereof, yet many of the phosphonamides are acids and form salts with basic substances. Nevertheless these phosphonamides as well as their salts, function as cationic active agents.

Concentrating processes of known types in which the collectors of this invention are useful include froth flotation, agglomeration with separation by means of shaking tables, underwater screens, moving belts, pneumatic launders, revolving perforated cylinders, etc. Other reagents may be used in conjunction with the collectors, appropriate to the particular process used, such as frothers, conditioners and modifiers. Of particular benefit are the water-insoluble, non-frothing hydrocarbon oils such as fuel oil, kerosene, etc. Alkalies and acids or other pH adjusters may also be employed, their utility being readily ascertained by simple experimentation with the particular ore being treated, in a manner well known in the art. In concentrating soluble ores such as potash, the process should be carried out in a saturated aqueous solution of the soluble ore constituents.

The present invention may advantageously be utilized in step procedures, in one of the steps of which the collectors described are used. Thus, in the case of phosphate ores, the phosphate may be first partially concentrated by the use of the well known methods utilizing an alkali, fatty acids and a hydrocarbon oil; after which these reagents are inactivated or removed from the concentrate, for example by agitation with sulfuric acid, and then the residual quartz is removed by means of the collectors of the present invention. Or a portion of the quartz may be first removed by the agents of the present invention, followed by flotation of the phosphate with an alkali, fatty acids and a hydrocarbon oil. Purer products are obtainable by such combination methods.

Particular advantages of the collectors of this invention are the wide variety of ores to which they are applicable and the fact that in flotation they usually act immediately after being distributed in the pulp, at the most a short conditioning period being all that is required. Those compounds substantially insoluble in water may advantageously be dissolved in an organic solvent before being added to the pulp.

In such concentration processes as froth flotation, agglomeration tabling and the like, it is essential that there shall be selectively imparted to one of the ore constituents an air-adherent water-repellent quality. It is the "functioning hydrocarbon group," as above defined, which gives to the reagents of this invention these essential qualities. It has been found by experiment that the "functioning hydrocarbon group," whether it be aromatic, arylalkyl, alicyclic or aliphatic, may permissibly contain such constituents as halogens, low-molecular weight hydrocarbon groups, or ether, thioether, ester, imino and amido linkages, without impairing its capacity for imparting air-adherence and water-repellency.

The following specific examples are given by way of illustration of various embodiments of the invention and will illustrate to those skilled in the art how it is to be practiced. Examples 1–10 illustrate the effectiveness of various members of the class of compounds described on phosphate ore, in the concentration of which the collectors of the invention make it possible to float or agglomerate silicious gangue, showing these various members of the class to be qualitatively similar in their function. In Examples 11–20 a variety of ores and minerals were concentrated or purified, using typical phosphonamides of the invention, illustrating its general applicability to ores of the classes referred to above.

EXAMPLE 1

Ortho phosphoric acid (0.2 mol.) and 7-ethyl-2-methyl-undecyl-4-monoamine (0.1 mol.) were heated until one mol. equivalent of water had passed off. The reaction mixture became quite viscous at this point and was removed from the heat. The product, 7-ethyl-2-methyl-undecyl-4-phosphonamide, exemplifies a compound having a branched chain aliphatic functioning hydrocarbon group. It was dissolved in methanol and tested as a collector in the froth flotation concentration of phosphate ore, comprising from 34 to 36% bone phosphate of lime (B. P. L.) admixed with silicious gangue, which was made into an aqueous pulp of 70% solids, agitated and deslimed, and conditioned for 15 seconds with the above phosphonamide in the amount of 2 lbs. per ton of ore. Flotation was then effected, silica being removed in the froth. The machine discharge, comprising the phosphate concentrate, contained 70.3% B. P. L. with a recovery of 92.7%.

EXAMPLE 2

Naphthenyl amines were prepared from naphthenic acids, B. P. 160–190° C. at 10 mm. These amines had an average molecular weight of 242 by titration and 254 calculated on the basis of a mol. wt. of 257 for the original acids. 0.2 mol. of ortho phosphoric acid and 0.1 mol. naphthenyl amines, which left a large excess of acid to insure the monophosphonamide, were heated until 1 mol. equivalent of water had passed off. Further heating had no noticeable effect on the compound. A viscous sirup was obtained which was not further purified. Treating with sodium hydroxide in water solution and with heating did not yield a free amine. The product, naphthenyl phosphonamide, exemplifies a compound having an alicyclic functioning hydrocarbon group, it being understood that, for this preparation, the word naphthenyl stands for a mixture of naphthenyl radicals of approximately 226 average mol. wt. This product was dissolved in ethanol and used as a collector in the manner explained in Example 1 except that the quantity used was 7.5 lbs. per ton of ore and 0.2 lb. per ton of pine oil was added as a frother. The machine discharge contained 76.3% B. P. L. with a recovery of 75.3%.

EXAMPLE 3

Hydroabietyl phosphate was prepared by esterifying 1 mol. of hydroabietyl alcohol with 0.5 mol. of ortho phosphoric acid anhydride in the presence of water, using benzene as a solvent. The hydroabietyl phosphate thus produced (0.1 mol.) was slowly warmed to fluidity and mixed with 0.1 mol. of lauryl amine. This mixture was heated until 1 mol. equivalent of water has been given off. The N-lauryl hydroabietyl phosphonamide thus produced exemplifies a phosphonamide in which one functioning hydrocarbon group is aromatic and consists of a hydrocarbon group such as is present in abietic acid. It also exemplifies a phosphonamide having two functioning hydrocarbon groups, the aromatic group attached to oxygen and the lauryl group to nitrogen. This phosphonamide was dissolved in dioxan and used as a collector in the concentration process described in Example 1, in the amount of 1.0 lb. per ton or ore and without other reagents, the machine discharge containing 71.4% B. P. L. with a recovery of 86.4%.

EXAMPLE 4

Phosphorous oxychloride (0.1 mol.) was dissolved in benzene and lauryl amine (0.1 mol.) was added with cooling. The benzene was then evaporated off and the reaction product, a syrupy residue, was recrystallized from ethyl ether. The resulting lauramino phosphorous oxychloride exemplifies a phosphonamide in which the OH groups attached to phosphorus have been substituted by a halogen, chlorine, showing that there need be no free OH groups present in the phosphonamide to give it cationic activity. This product was dissolved in dioxan and used as a collector, in the amount of 1.0 lb. per ton of ore, as set forth in Example 1 except that the pulp was diluted to 10% solids. Flotation was effected, the machine discharge containing 74.6% B. P. L. with a recovery of 71.2%.

EXAMPLE 5

Hydroabietyl phosphate was prepared as in Example 3 and was heated with an equal weight of urea, below 250° C., until water ceased to be expelled. No attempt was made to determine the structure of the product which may have been either N-urea hydroabietyl phosphonamide or N,N'-urea dihydroabietyl diphosphonamide, in either of which, however, the functioning hydrocarbon group, the hydroabietyl radical, is attached to oxygen. This product was used as a collector as set forth in Example 1 in the amount of 4 lbs. per ton of ore dissolved in 27.5 lbs. of ligroin per ton of ore. The machine discharge contained 65.4% B. P. L. and recovery was 77.7%.

EXAMPLE 6

Fifty grams of commercial dioctadecyl amine, consisting of approximately 75% di-n-octadecyl and 25% tri-n-octadecyl amine, was melted in 15.3 grams of phosphorous oxychloride added to it by dropping with stirring and external cooling. The reaction product was poured into an excess of 6% sodium hydroxide solution which was chilled. A white powder came down which was dissolved in anhydrous methanol. The unreacted tri-n-octadecyl amine was insoluble and was removed by filtration. On cooling the methanol solution, what is believed to be the di-n-octadecyl-monophosphonamide precipitated out as a white powder. It is possible, however, that the monosodium salt was formed and possibly some di-sodium salt. The product exemplifies a phosphonamide, or the sodium salt thereof, having two functioning hydrocarbon groups attached to one nitrogen atom and was dissolved in dioxan and used as a collector, in the amount of 2 lbs. per ton of ore, as set forth in Example 1 with the addition to the pulp of 0.5 lb. per ton of NaOH. Flotation was effected and the machine discharge contained 64.2% B. P. L. with a recovery of 94.7%.

EXAMPLE 7

Normal dodecyl amine and ortho phosphoric acid were heated for 15 minutes in a ratio of 3 mols. amine to 1 mol. of acid in an open beaker using litharge, 1 g., as catalyst, at a maximum temperature of 220° C. The reaction mixture was extracted with 80% isopropanol and the filtrate from the extraction chilled to obtain white crystals of tri-n-dodecyl - tri - phosphonamide. This product, which exemplifies a phosphonamide having three functioning hydrocarbon groups attached to three different nitrogen atoms, was dissolved in isopropanol and used as a collector as in Example 1, in the amount of 0.5 lb. per ton of ore, there being also added to the pulp 1.1 lbs. of kerosene and 1.0 lb. of sulfuric acid. Flotation was effected and the machine discharge contained 71.9% B. P. L. with a recovery of 86.9%.

EXAMPLE 8

N-monododecyl phosphonamide was prepared by heating laurylamine with an excess of ortho phosphoric acid, in the presence of lead oxide catalyst at 200° C. for 1½ hours. The reaction product was purified by dissolving in isopropanol, filtering, precipitating, redissolving in hot ethyl alcohol, filtering while hot, reprecipitating by cooling, and recrystallizing several times from ethanol. The product is soluble in hot ethanol but insoluble in water. However, good flotation results have been obtained by adding the solid product to pulp in a flotation cell, conditioning for 15 seconds and floating. When this collector compound was added to an ore pulp as a 2.5% solution in ethanol, followed by a conditioning period of 15 seconds, the results shown in tests 1 and 2 of the following table were obtained. The phosphate feed contained 35.4% B. P. L.

| Test No. | Reagents—lbs./ton feed | | | | Machine discharge | |
|---|---|---|---|---|---|---|
| | Collector | Kerosene | NaOH | H₂SO₄ | B.P.L. | B.P.L. rec. |
| | | | | | Per cent | Per cent |
| 1 | 1.0 | | | | 78.0 | 75.4 |
| 2 | 0.6 | | | | 75.1 | 83.9 |
| 3 | 0.6 | 0.6 | | | 74.5 | 85.6 |
| 4 | 0.6 | | 0.5 | | 75.9 | 88.7 |
| 5 | 0.6 | | | 0.5 | 73.9 | 84.5 |

Tests 3, 4 and 5 illustrate the use of kerosene, NaOH and H₂SO₄, respectively, along with the phosphonamide collector.

Various salts of dodecyl phosphonamide were also successfully used as collectors including ammonium, substituted ammonium, alkali metal, and metal salts. Among these were the laurylamine and di-laurylamine salts, and the lead and calcium salts. The two latter salts are difficult to dissolve and so it may be preferable to form the salt in situ in the pulp as was done by adding to a pulp of 10% solids 4 lbs of monododecyl phosphonamide and 1.3 lbs. of calcium hydroxide, both per ton of ore. With this collector a grade of 70% and a recovery of 85.3% were obtained, in the absence of any other reagents. Results with two amine salts of phosphonamides are recorded in Examples 9 and 10.

EXAMPLE 9

Phosphate ore was made into an aqueous pulp of 15% solids and agitated in a laboratory flotation cell for 15 seconds with 0.8 lb. of laurylamine salt of monoethyl N-monododecyl phosphonamide and 4 lbs. of kerosene, both per ton of ore. The phosphonamide salt was introduced as a 2.5% solution in isopropanol. Flotation was effected, silicious material being removed in the froth, the machine discharge containing the phosphate concentrate comparatively free from silicious gangue. Results were as follows:

| Product | Weight | B. P. L. | Insol. | B. P. L. rec. |
|---|---|---|---|---|
| | Per cent | Per cent | Per cent | Per cent |
| Feed | 100.0 | 43.7 | | 100.0 |
| Machine discharge | 51.6 | 74.3 | 9.9 | 87.7 |
| Froth product | 48.4 | 11.1 | | 12.3 |

EXAMPLE 10

The ore and procedure were identical with Example 9, the reagents used being 0.8 lb. of stearylamine salt of monoethyl N-mono-octadecyl phosphonamide and 4 lbs. of kerosene, both per ton of ore. Results were as follows:

| Product | Weight | B. P. L. | Insol. | B. P. L. rec. |
|---|---|---|---|---|
| | Per cent | Per cent | Per cent | Per cent |
| Feed | 100.0 | 43.5 | | 100.0 |
| Machine discharge | 50.9 | 79.1 | 4.0 | 92.5 |
| Froth product | 49.1 | 6.6 | | 7.5 |

The following examples demonstrate the applicability of the phosphonamide collectors of the invention to the concentration of other ores than phosphate, to which the foregoing examples are directed.

In Examples 11, 12 and 13 the collector used was diethyl N-monododecyl phosphonamide prepared from laurylamine and diethyl phosphoric acid, the collector being separated from the reaction product, after it had refluxed for 6 hours in isopropanol, by vacuum distillation. This phosphonamide is water-dispersible and was added to the pulp in the form of a 2.5% solution in isopropanol.

EXAMPLE 11

Barite ore of a fineness to pass a 35-mesh screen was made into an aqueous pulp of 25% solids and agitated in a laboratory flotation cell for 15 seconds with 0.2 lb. of the collector and 0.2 lb. of pine oil, both per ton of feed. Flotation was effected, silicious matter being removed in the froth, the machine discharge constituting the barite concentrate. The $SiO_2$ content of the feed, which was 9.3%, was reduced to 4.7% in the discharge.

EXAMPLE 12

To show the applicability of the invention to calcite ore a synthetic feed was made up from pure calcite and glass sands, sized to pass 35 mesh but remain on 150 mesh before mixing, and was made into a pulp of 10% solids in a laboratory flotation cell. 0.6 lb. of the collector and 0.2 lb. of pine oil, both per ton of ore, were agitated for 15 seconds, to distribute them in the pulp, and flotation was then effected, a product high in silicious material being gathered in the froth. The grade was raised from 68.9% $CaCO_3$ in the feed to 98.4% in the machine discharge and the recovery was 74.9%.

EXAMPLE 13

A synthetic feed of fluorspar mixed with glass sands was made up and concentrated in the same manner as the feed in Example 10 except that 0.8 lb. per ton of the collector plus 0.2 lb. of pine oil were the reagents. The grade of fluorspar was raised from 79.8% in the feed to 96.5% in the machine discharge with a recovery of 93.4%, showing excellent separation of the silicious material.

EXAMPLE 14

This example illustrates the use of a collector of the invention in the concentration of feldspar by table concentration procedures. A sample of feldspar ore containing silica and mica impurities was ground to pass a 20 mesh but to be retained on a 48 mesh screen and was conditioned for two minutes in a pulp containing 70% solids with sulfuric acid and fuel oil in the quantities shown in the tabulation. The pulp was then fed to a shaking table while being diluted with water and a mica concentrate taken off at the side of the table. The table-end product was thickened to 70% solids and again conditioned for two minutes with more acid and fuel oil and stearylamine salt of monoethyl N-mono-octadecyl phosphonamide as a 5% aqueous dispersion, diluted and retabled. The side products of the table were divided into feldspar concentrate and middling and the table-end product constituted final tailing consisting largely of silicious gangue. The results are tabulated below.

STEP 1.—MICA SEPARATION

*Reagents, lbs. per ton of feed*

Sulfuric acid _____ 7.4
Fuel oil _____ 8.9

STEP 2.—FELDSPAR CONCENTRATION

*Reagents, lbs. per ton of feed*

Sulfuric acid _____ 3.7
Fuel oil _____ 4.5
Stearylamine salt of monoethyl N-mono-octadecyl phosphonamide _____ 0.8

| Table product | Per cent weight | Assays | | | Distribution | |
|---|---|---|---|---|---|---|
| | | $Al_2O_3$ | $SiO_2$ | Fe | $Al_2O_3$ | $SiO_2$ |
| Feed | 100.0 | 15.0 | 74.1 | 0.9 | 100.0 | 100.0 |
| Side prod. mica conc. | 3.8 | 27.0 | 48.8 | 4.0 | 6.7 | 2.6 |
| Side prod. feld. conc. | 58.5 | 19.6 | 66.4 | 0.6 | 76.7 | 52.4 |
| Side prod. feld. mid. | 9.7 | 18.8 | 69.4 | 0.7 | 12.0 | 9.0 |
| End prod. tailing | 28.0 | 2.6 | 95.2 | 1.1 | 4.6 | 36.0 |

EXAMPLE 15

This example illustrates the flotation of feldspar with the same collector as that used in Example 14. Feldspar ore was ground to minus 48 mesh, deslimed and conditioned for one minute in a pulp of 70% solids with the amounts of the reagents shown in the table. The collector was introduced as a 5% aqueous dispersion. The conditioned pulp was diluted and flotation effected with the results shown.

*Reagents, lbs. per ton of feed*

Sulfuric acid _____ 3.7
Fuel oil _____ 3.3
Pine oil _____ 0.2
Stearylamine salt of monoethyl N-mono-octadecyl phosphonamide _____ 0.6

| Products | Per cent weight | Assays | | Distribution | |
|---|---|---|---|---|---|
| | | $Al_2O_3$ | $SiO_2$ | $Al_2O_3$ | $SiO_2$ |
| Feed | 100.0 | 15.4 | 74.0 | 100.0 | 100.0 |
| Froth Product | 71.7 | 18.3 | 68.9 | 85.4 | 66.8 |
| Middling—2 | 2.9 | 14.8 | 75.1 | 2.8 | 2.9 |
| Middling—1 | 11.9 | 12.7 | 79.4 | 9.8 | 12.8 |
| Tailing | 13.5 | 2.2 | 96.0 | 2.0 | 17.5 |

EXAMPLE 16

A sample of Minnesota iron ore, of a fineness to pass a 48 mesh screen, was made into a pulp of 50% solids in a laboratory flotation cell and conditioned with sodium hydroxide, 1.0 lb. per ton of feed, for one minute. The pulp was then diluted to 25% solids, the reagents shown were added and agitated 15 seconds for distribution and flotation effected with the results shown:

*Reagents, lbs. per ton of feed*

Pine oil _____ 0.2
Dodecylamine salt of monododecyl phosphonamide (1.25% solution in ethanol) _____ 0.2

| Products | Weight | Fe | Fe rec. |
|---|---|---|---|
| | Per cent | Per cent | Per cent |
| Feed | 100.0 | 47.8 | 100.0 |
| Froth product | 23.7 | 19.2 | 9.5 |
| Middling | 15.3 | 39.9 | 12.8 |
| Machine discharge | 61.0 | 60.8 | 77.7 |
| Mach. discharge and mid | 76.3 | 56.6 | 90.5 |

EXAMPLE 17

This example illustrates the separation of silicious iron-bearing impurities from glass sands. An industrial sand containing ferruginous impurities, principally as mica, was conditioned with 3.7 lbs. of sulfuric acid and 0.25 lb. of the stearylamine salt of monoethyl N-mono-octadecyl phosphonamide, subjected to froth flotation and a micaceous float removed, leaving 82.4% by weight of the feed as a glass sand product which contained, by analysis, only 0.018% iron.

The following Examples 18, 19 and 20 illustrate the application of the phosphonamide collectors of this invention to the separation of soluble sylvite from halite, both occurring as the soluble ore sylvinite.

EXAMPLE 18

Sylvinite ore from Carlsbad, New Mexico, was crushed to pass a 10 mesh screen, and was then deslimed and ground in saturated brine so that it would pass a 35 mesh screen, after which it was made into a pulp of about 20% solids with a saturated solution of ore constituents. Reagents, as hereinafter specified, were added to this pulp, the pulp was then agitated about 10 seconds to distribute the reagents and flotation was then effected. The first or rougher froth concentrate was returned to the flotation machine, diluted and refloated. This was repeated on the second froth concentrate. The reject of the first flotation operation was final tailings. Rejects of the second and third flotation operations were middlings to be returned to the flotation circuit and further values recovered therefrom. The reagents used were stearylamine salt of monoethyl N-mono-octadecyl phosphonamide 1.0 lb. (as a 2.5% solution in isopropanol) and pine oil 0.2 lb., both per ton of ore treated. Results were as follows:

| Product | Weight | KCl | KCl rec. |
|---|---|---|---|
| | Per cent | Per cent | Per cent |
| Feed | 100.0 | 27.9 | 100.0 |
| Concentrate | 28.1 | 80.3 | 80.8 |
| Middling—2 | 2.7 | 10.5 | 1.0 |
| Middling—1 | 8.3 | 7.4 | 2.2 |
| Tailing | 53.7 | 5.9 | 11.3 |
| Slime | 7.2 | 18.4 | 4.7 |

It will be seen that a recovery of 80.8% KCl of a grade of 80.3% was obtained.

EXAMPLE 19

The test of Example 18 was repeated with the addition of 0.8 lb. of fish glue as an auxiliary agent, the glue and the phosphonamide being introduced as 5% aqueous solutions or dispersions. The results were as follows:

| Product | Weight | KCl | KCl rec. |
|---|---|---|---|
| | Per cent | Per cent | Per cent |
| Feed | 100.0 | 26.7 | 100.0 |
| Concentrate | 23.9 | 91.4 | 81.9 |
| Middling—2 | 1.2 | 39.8 | 1.8 |
| Middling—1 | 4.6 | 12.9 | 2.2 |
| Tailing | 66.3 | 5.3 | 13.1 |
| Slime | 4.0 | 6.6 | 1.0 |

It will be noted that the addition of the glue increased grade by 11.1% and recovery by 1.1% over Example 18.

EXAMPLE 20

The test of Example 18 was repeated with the addition of 0.8 lb. of potato dextrin, dextrin and phosphonamide being introduced as aqueous solutions or dispersions. Results were as follows:

| Product | Weight | KCl | KCl rec. |
|---|---|---|---|
| | Per cent | Per cent | Per cent |
| Feed | 100.0 | 27.2 | 100.0 |
| Concentrate | 20.5 | 90.4 | 68.3 |
| Middling—2 | 1.2 | 59.1 | 2.6 |
| Middling—1 | 5.5 | 23.0 | 4.7 |
| Tailing | 67.1 | 8.1 | 20.1 |
| Slime | 5.7 | 20.6 | 4.3 |

It will be noted that addition of dextrin increased grade by 10.1% with a sacrifice in recovery of 12.5% over Example 18.

Summarizing some of the points illustrated by the foregoing examples, it will be observed that it has been shown that a wide range of compounds containing the fundamental phosphonamide group and at least one functioning hydrocarbon group function as collectors. The phosphonamides of the examples include compounds in which the functioning hydrocarbon group or groups are aliphatic, branched chain aliphatic, alicyclic and aromatic; in which they are attached to oxygen, to nitrogen, and to both; in which two such groups are attached to one nitrogen; and in which three such groups are attached to three different nitrogens. They also show that the compound may have all of its OH groups replaced by a halogen and a variety of salts of phosphonamides have been shown to act as collectors.

The compounds of the examples and the particular procedures and ores therein set forth are to be taken as illustrative merely and not as limitations of the invention which is to be construed broadly within the purview of the claims.

What is claimed is:

1. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector selected from the group consisting of: phosphonamides and their salts which contain at least one functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; and subjecting the thus conditioned pulp to a concentration operation to separate the ore constituents.

2. The process of claim 1 wherein the said functioning hydrocarbon group is attached to the amido nitrogen atom of the phosphonamide nucleus.

3. The process of claim 1 wherein the said functioning hydrocarbon group is attached to an atom of the phosphonamide other than the nitrogen atom of the phosphonamide nucleus.

4. The process of claim 1 wherein a functioning hydrocarbon group as defined in claim 1 is attached to the amido nitrogen atom of the phosphonamide nucleus and another such functioning hydrocarbon group is attached to a different atom of the phosphonamide.

5. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector of the general formula

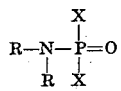

wherein R is hydrogen, an amido group or a functioning hydrocarbon group from the class of aliphatic groups containing 7 or more carbon atoms at least 5 of which are in a single straight chain, hydrocarbon groups present in abietic and naphthenic acids, and naphthalene and substituted benzene groups; X is OR, NRR, OY or a halogen, Y being a salt forming group or element; at least one R in the molecule being a functioning hydrocarbon group as above defined; and subjecting the thus conditioned pulp to a concentration operation to separate the ore constituents.

6. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with a collector selected from the group consisting of phosphonamides and their salts which contain at least one functioning hydrocarbon group which is an aliphatic group of at least 7 carbon atoms at least 5 of which are in a single straight chain; and subjecting the thus conditioned pulp to a concentration operation to separate the ore constituents.

7. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with N-monododecyl phosphonamide, and subjecting the thus conditioned pulp to a concentration operation to separate the ore constituents.

8. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with the stearylamine salt of monoethyl N-monooctadecyl phosphonamde, and subjecting the thus conditioned pulp to a concentration operation to separate the ore constituents.

9. The process of separating the components of ores of the class consisting of non-sulfide non-silicate minerals admixed with silicious gangue and silicate minerals admixed with quartz and soluble potash minerals occuring in their soluble ores, which comprises admixing an aqueous pulp of the ore in a suitably divided state with a collector selected from the group consisting of phosphonamides and their salts containing at least one functioning hydrocarbon group which is an alicyclic group such as is present in the naphthenic acids, and subjecting the thus conditioned pulp to a concentration operation to separate the ore constituents.

10. The process of separating the components of ores of the class consisting of non-sulfide non-silicate minerals admixed with silicious gangue and silicate minerals admixed with quartz and soluble potash minerals occurring in their soluble ores, which comprises admixing an aqueous pulp of the ore in a suitably divided state with naphthenyl phosphonamide, and subjecting the thus conditioned pulp to a concentration operation to separate the ore constituents.

11. The process of claim 1 in which the concentration operation is a froth-flotation treatment in a froth-flotation machine.

12. The process of claim 1 in which the concentration operation is effected by means of a shaking table.

13. The process of concentrating phosphate minerals from their ores containing silicious gangue which comprises admixing an aqueous pulp of the ore in a suitably divided state with N-monododecyl phosphonamide and subjecting the thus conditioned pulp to a concentration operation to separate the ore constituents.

14. The process of concentrating phosphate minerals from their ores containing silicious gangue which comprises admixing an aqueous pulp of the ore in a suitably divided state with an aliphatic amine salt of monoethyl N-monooctadecyl phosphonamide and subjecting the thus conditioned pulp to a concentration operation to separate the ore constituents.

15. The process of concentrating phosphate minerals from their ores containing silicious gangue which comprises admixing an aqueous pulp of the ore in a suitably divided state with naphthenyl phosphonamide and subjecting the thus conditioned pulp to a concentration operation to separate the ore constituents.

KARL F. SCHILLING.
ALLEN T. COLE.
JAMES B. DUKE.
WESLEY M. HOUSTON.